(12) United States Patent
Gallimore et al.

(10) Patent No.: US 9,829,037 B2
(45) Date of Patent: Nov. 28, 2017

(54) BEARING STRUCTURE

(71) Applicant: ROLLS-ROYCE PLC, London (GB)

(72) Inventors: Stephen Gallimore, Lincoln (GB); Paul Fletcher, Rugby (GB); Philip Peters, Sherbourne (GB)

(73) Assignee: ROLLS-ROYCE plc, London (GB)

( * ) Notice: Subject to any disclaimer, the term of this patent is extended or adjusted under 35 U.S.C. 154(b) by 104 days.

(21) Appl. No.: 14/961,124

(22) Filed: Dec. 7, 2015

(65) Prior Publication Data

US 2016/0160911 A1     Jun. 9, 2016

(30) Foreign Application Priority Data

Dec. 9, 2014 (GB) .................................. 1421881.2

(51) Int. Cl.
*F16C 27/00* (2006.01)
*F16C 19/54* (2006.01)
(Continued)

(52) U.S. Cl.
CPC .............. *F16C 19/54* (2013.01); *F01D 25/16* (2013.01); *F01D 25/164* (2013.01); *F02C 7/06* (2013.01);
(Continued)

(58) Field of Classification Search
CPC .......... F16C 19/04; F16C 19/06; F16C 19/16; F16C 19/52; F16C 19/522; F16C 19/54;
(Continued)

(56) References Cited

U.S. PATENT DOCUMENTS 3,574,424 A * 4/1971 Hagemeister ........... F16C 25/08
384/517
3,578,232 A * 5/1971 Loyd ....................... F16C 19/54
156/73.5
(Continued)

FOREIGN PATENT DOCUMENTS

DE     101 26 103 A1    3/2002
EP      1 956 253 A1    8/2008
(Continued)

OTHER PUBLICATIONS

May 27, 2016 Search Report issued in European Patent Application No. 15197773.
(Continued)

*Primary Examiner* — Alan B Waits
(74) *Attorney, Agent, or Firm* — Oliff PLC

(57) ABSTRACT

Load sharing stacked bearing structure including first bearing having a first inner race, first outer race and first set of roller elements housed between first inner race and first outer race and a second bearing having a second inner race, second outer race and second set of roller elements housed between second inner race and the second outer race. A housing surrounds the first and second bearings. First compliant element is provided with the first compliant element connected between the housing and the first outer race. The first compliant element, first outer race and housing define at a pressure chamber. The first outer race axially slidable relative to the second outer race such that an increase in pressure in pressure chamber causes a change in axial spacing between the outer races. This induces an additional axial load on the bearings which helps balance thrust load sharing.

19 Claims, 5 Drawing Sheets

(51) Int. Cl.

| | | |
|---|---|---|
| *F16C 19/52* | (2006.01) | |
| *F16C 19/06* | (2006.01) | |
| *F16C 35/04* | (2006.01) | |
| *F01D 25/16* | (2006.01) | |
| *F16C 41/02* | (2006.01) | |
| *F02C 7/06* | (2006.01) | |
| *F16C 25/08* | (2006.01) | |
| *F16C 33/78* | (2006.01) | |
| *F16C 19/16* | (2006.01) | |

(52) U.S. Cl.
CPC ............ *F16C 19/06* (2013.01); *F16C 19/522* (2013.01); *F16C 25/08* (2013.01); *F16C 33/7823* (2013.01); *F16C 35/042* (2013.01); *F16C 41/02* (2013.01); *F05D 2220/32* (2013.01); *F05D 2240/54* (2013.01); *F05D 2260/15* (2013.01); *F16C 19/16* (2013.01); *F16C 2360/23* (2013.01)

(58) Field of Classification Search
CPC ........ F16C 19/547; F16C 41/02; F16C 25/08; F16C 39/04; F16C 2360/23; F16C 2360/24; F16C 23/06; F16C 27/04; F16C 35/042; F16C 33/7816; F16C 33/782; F16C 33/7823; F16C 33/586; F01D 25/16; F01D 25/164; F05D 2240/54; F05D 2220/32
See application file for complete search history.

(56) References Cited

U.S. PATENT DOCUMENTS

| | | | | |
|---|---|---|---|---|
| 4,023,868 A | * | 5/1977 | Miki ..................... | F16C 19/364 384/100 |
| 4,611,934 A | | 9/1986 | Piotrowski et al. | |
| 4,676,667 A | * | 6/1987 | Komatsu ................ | F01D 25/16 384/517 |
| 5,603,602 A | | 2/1997 | Romani | |
| 6,846,158 B2 | | 1/2005 | Hull | |
| 8,083,472 B2 | * | 12/2011 | Maguire ................... | F01D 3/04 384/490 |
| 8,182,201 B2 | * | 5/2012 | Alecu ................... | F01D 25/168 415/104 |
| 8,727,629 B2 | | 5/2014 | Do et al. | |
| 9,447,817 B2 | * | 9/2016 | Gallimore ............... | F01D 25/16 |
| 9,470,262 B2 | * | 10/2016 | Gallimore ............. | G01M 13/04 |
| 9,651,092 B2 | * | 5/2017 | Gallimore ............... | F16C 39/04 |
| 2009/0103849 A1 | * | 4/2009 | Maguire ................... | F01D 3/04 384/624 |
| 2015/0267745 A1 | * | 9/2015 | Gallimore ............... | F16C 19/54 384/101 |
| 2016/0160911 A1 | * | 6/2016 | Gallimore ................ | F02C 7/06 384/448 |

FOREIGN PATENT DOCUMENTS

| | | |
|---|---|---|
| EP | 2 050 932 A2 | 4/2009 |
| EP | 2 246 528 A2 | 11/2010 |
| EP | 2 921 729 A2 | 9/2015 |
| EP | 2921655 A2 | 9/2015 |
| GB | 931904 A | 7/1963 |
| GB | 965465 A | 7/1964 |
| GB | 1129937 A | 10/1968 |
| GB | 2 107 002 A | 4/1983 |
| JP | S51-29648 A | 3/1976 |

OTHER PUBLICATIONS

Jun. 15, 2016 Notice of Allowance issued in U.S. Appl. No. 14/961,027.

May 27, 2016 Search Report issued in European Patent Application No. 15197774.

Jun. 5, 2015 Search Report issued in British Patent Application No. 1421881.2.

Jun. 6, 2015 Search Report issued in British Patent Application No. 1421880A.

U.S. Appl. No. 14/961,027, filed Dec. 7, 2015 in the name of Gallimore et al.

\* cited by examiner

BEARING STRUCTURE

TECHNOLOGICAL FIELD

The present disclosure relates to a bearing arrangement and a gas turbine engine having such a bearing arrangement.

BACKGROUND

In gas turbine engines, one or more rotors of the engine can be subjected to axial thrust loads during operation. Thrust loads arise in a gas turbine engine as the result of pressure imbalances. For example, a compressor has a higher downstream pressure than upstream pressure which forces the compressor upstream (towards the intake) whereas a turbine has a higher upstream pressure than downstream pressure which forces the turbine downstream (towards the exhaust nozzle). The thrust loads urging the compressor upstream and the compressor downstream are high and uncertain.

The thrust loads are often at their maximum during the periods of highest power output for the engine. In a gas turbine engine providing jet propulsion for an aircraft, this period of maximized power output can occur when the aircraft is taking-off and/or climbing to a cruising altitude. The thrust loads can change direction (passing through a zero load point) during a flight cycle.

A thrust bearing can be positioned to support the rotor against these thrust loads. A thrust bearing typically comprises an inner and outer race, a cage and a set of roller elements, the roller elements being spheres (or balls) which are contained within a raceway formed in one or both of the races with the cage maintaining the spacing between the balls.

Since single thrust bearings inevitably have a limited thrust capability, two or more bearings may be arranged adjacent one another to share the thrust load. In these so-called "stacked" bearing arrangements, small variations (of the order of a few microns in some cases) in the geometry of the sets of rolling elements or races between the bearings can lead to one bearing taking more of the load than the other(s). Furthermore, under-loading of one set of rolling elements may result in "skidding" of that set, which may cause damage, debris release and bearing failure. For these reasons, the geometry of the rolling elements and races of the different bearings needs to be carefully controlled and matched so that the load may be shared (ideally equally) between the bearings. This requirement to precision-engineer and match bearings in pairs (or other multiples) incurs costs in the manufacturing and supply chain.

Furthermore, the materials of the rolling elements and/or bearing races may expand in use due to heating, which can further exacerbate the geometrical variations and lead to a "runaway" effect in which one bearing takes progressively more of the load, potentially resulting in bearing failure. This may occur even if matched bearings are selected and installed because even very small geometrical variations between the bearings may be magnified under the severe environmental operating conditions in gas turbine engines.

There is a desire to provide a stacked bearing arrangement which improves the balancing of thrust load bearing between bearings in order to reduce excessive loading or under-loading of a bearing thus reducing bearing failure and vibration/skidding.

BRIEF SUMMARY

In a first aspect, there is provided a stacked bearing structure comprising:

a first bearing having a first inner race, a first outer race and a first set of roller elements housed between the first inner race and the first outer race;

a second bearing having a second inner race, a second outer race and a second set of roller elements housed between the second inner race and the second outer race;

a housing surrounding the first and second bearings;

a first compliant element, the first compliant element connected between the housing and the first outer race, wherein the first compliant element, first outer race and housing define a pressure chamber; and wherein the first outer race is axially slidable relative to the second outer race such that an increase in pressure in the pressure chamber causes a change in axial spacing between the first and second outer races.

By providing a first and outer race that is axially slidable relative to the second outer race upon an increase in pressure in the pressure chamber defined by the first outer race, first compliant element and housing, it is possible to vary the axial spacing between the outer races and to induce an additional axial load on the bearings. This additional axial load can be induced (by increasing the pressure in the pressure chamber) in situations where under-loading of a bearing is predicted or measured to ensure that vibration/skidding of the bearing is avoided. Furthermore, by increasing the axial load on the potentially under-loaded bearing, this bearing becomes better able to transmit the thrust load thus resulting in a more equal sharing of the thrust load between the bearings.

Optional features of the disclosure will now be set out. These are applicable singly or in any combination with any aspect of the disclosure.

In some embodiments, the stacked bearing structure further includes a second compliant element, the second compliant element connected between the housing and the second outer race.

In some embodiments, the first and second compliant elements are provided at opposing axial ends of the stacked bearing structure and the compliant elements, outer races and housing define a single pressure chamber. In these embodiments, an increase in pressure in the pressure chamber causes the outer races to move away from one another.

In these embodiments, the first outer race and second outer race may be slidably mounted to one another. For example, one of the outer races may comprise an axial flange whilst the other comprises an axial lip, the axial flange and axial lip forming a sliding abutment. The axial lip may comprise a seal (e.g. an O-ring or piston ring housed in a groove or a lip seal) to seal the pressure chamber whilst allowing sliding of the races.

In some embodiments, the first compliant element, first outer race and housing define a first pressure chamber and the second compliant element, second outer race and housing define a second pressure chamber. In some of these embodiments, the first compliant element may be proximal the second bearing (towards the axial middle of the stacked bearing structure) and the second compliant element may be distal the first bearing (at an axial end of the stacked bearing). In these embodiments, an increase in pressure of the first pressure chamber causes the first bearing to move towards the second bearing and an increase in pressure in the second chamber causes the second bearing to move away from the first bearing.

In these embodiments, the outer races may be slidably mounted to the housing. For example, the housing may comprise a first radial extension against which the first outer race is slidably mounted. The housing may comprise a second radial extension against which the second outer race is slidably mounted. Each radial extension may comprise a respective annular projection against which a respective annular lip extending axially from each of the outer races forms a sliding abutment. The axial lips may each comprise a respective seal (e.g. an O-ring or piston ring housed in a respective groove or a lip seal) for sealing the axial lips against the respective annular projection.

In some embodiments, the first/second compliant element may be a flexible diaphragm.

In some embodiments, the first/second compliant element may be a flexible bellows.

The flexible diaphragm(s)/bellow(s) may be formed, for example, from mild steel, stainless steel, steel alloy, titanium alloy or a super elastic material. These are materials with a high ratio of strength to elasticity.

In some embodiments, the first and second compliant element (e.g. first and second diaphragm) may be slidably mounted to the housing. For example, the housing may comprise a first groove for locating the radially outer end of the first compliant element. The housing may comprise a second groove for locating the radially outer end of the second compliant element. The grooves may have an axial dimension that is greater than the axial dimension of the radially outer ends of the compliant elements so that the radially outer ends of the compliant elements can slide within the grooves.

The first and second compliant elements are fixedly connected to the respective outer race.

The first bearing may be upstream or downstream from the second bearing.

In some embodiments, a valved pressure inlet is provided through the housing to provide fluid communication from a pressure source to the pressure chamber. Where two pressure chambers are provided, two separate valved pressure inlets are provided through the housing each providing fluid communication between the pressure source and the respective pressure chamber. The valved pressure inlets are separately operable to allow selective pressurisation of the two pressure chambers.

The pressure source may comprise compressed air (e.g. from the starter air supply or the HP compressor delivery air) or high pressure hydraulic fluid.

In some embodiments, a valved pressure outlet is provided through the housing to allow venting of pressure from within the pressure chamber. Where two pressure chambers are provided, two separate valved pressure outlets are provided through the housing each allowing venting from the respective pressure chamber. The valved pressure outlets are separately operable to allow selective de-pressurisation of the two pressure chambers.

In some embodiments, the stacked bearing structure comprises load sensors associated with each bearing. The load sensors may, for example, include eddy current probes, strain gauges or microwave probes. These load sensors can be used to monitor the axial loads on each bearing to provide feedback to an electronic control module (ECM). The ECM can trigger pressurisation of the pressure chamber(s) (through the pressure inlet(s)) if the axial load on any bearing is found to be below a predetermined minimum (e.g. 1000 lbf≈4450 N).

The load sensors and ECM can be used to trigger venting of the pressure chamber(s) (through the pressure outlet(s)).

The load sensors and ECM can be used to continually/regularly adjust the pressure within the pressure chamber(s) to maintain the axial loading on each bearing above a predetermined minimum (e.g. 1000 lbf≈4450 N).

In some embodiments, the stacked bearing structure comprises a pressure sensor arranged to detect the pressure within the/each pressure chamber.

The stacked bearing structure may comprise three or more thrust bearings.

The thrust bearings may be ball bearings, tapered cylindrical roller bearings, hydrostatic bearings, or hydrodynamic bearings.

In a second aspect, there is provided a gas turbine engine comprising a stacked bearing structure according to the first aspect.

BRIEF DESCRIPTION

Embodiments will now be described by way of example with reference to the accompanying drawings in which.

DETAILED DESCRIPTION

Figure 1:
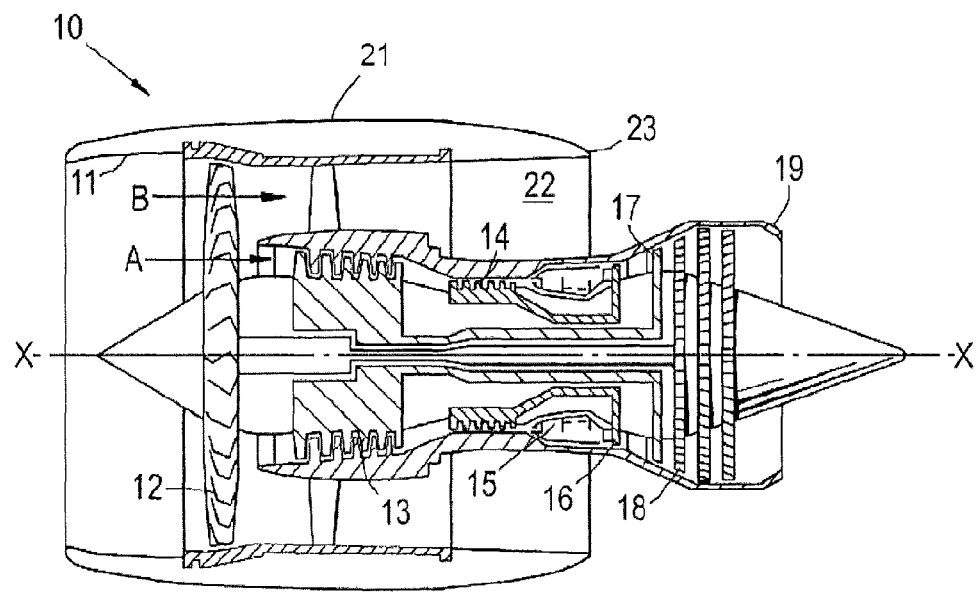
FIG. 1 shows a ducted fan gas turbine engine.

With reference to FIG. 1, a ducted fan gas turbine engine incorporating one or more stacked bearing structures is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Stacked thrust bearing structures such as that shown in the following figures are provided to support the rotating shafts.

Figure 2:
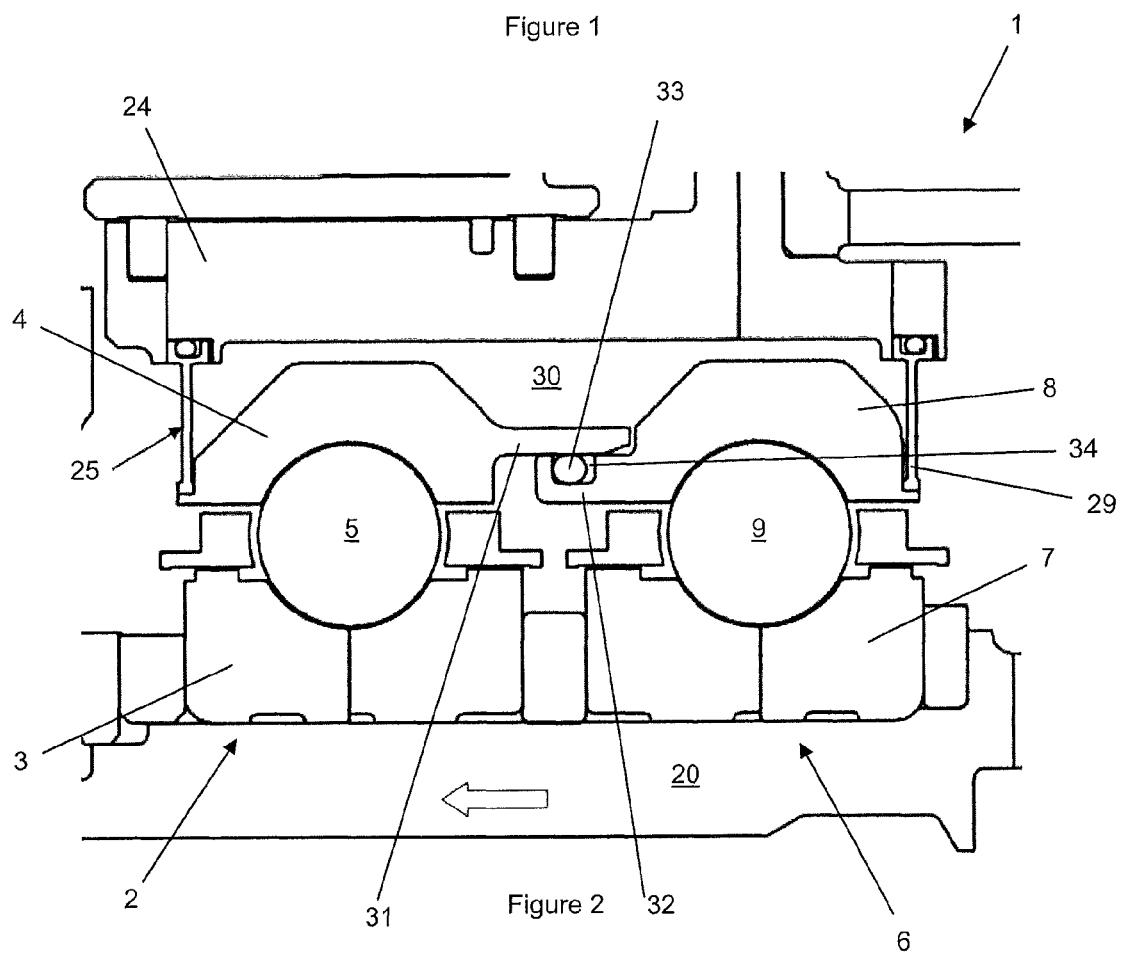
FIG. 2 shows a first embodiment of a stacked bearing structure according to various examples.

FIG. 2 shows a first embodiment of a stacked bearing structure 1 comprising a first bearing 2 having a first inner race 3, a first outer race 4 and a first set of roller elements 5 housed between the first inner race 3 and the first outer race 5.

A second bearing 6 having a second inner race 7, a second outer race 8 and a second set of roller elements 9 housed between the second inner race 7 and the second outer race 8 is provided adjacent the first bearing 2.

Both of the inner races 3, 7 are connected to and rotate with a rotor shaft 20. Both of the outer races 4, 8 face an annular housing 24 which is a static component within the gas turbine engine.

The first bearing 2 further comprises a first compliant element which is a first flexible diaphragm 25 that is fixedly connected to the first outer race 4 at its radially inner end and slidably connected to the housing 24 at its radially outer end. The first flexible diaphragm 25 is provided at a first axial end of the stacked bearing structure 1 distal the second bearing 6.

Figure 3:
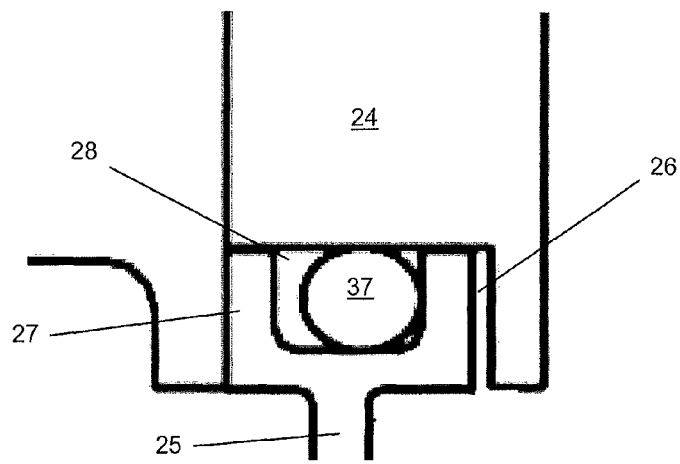
FIG. 3 shows a sliding join between components of the first embodiment.

The sliding connection at the radially outer end of the first flexible diaphragm 25 is shown in FIG. 3.

The housing 24 comprises a first annular groove 26. The radially outer end 27 of the first flexible diaphragm 25 is received in the first annular groove 26. The radially outer end 27 of the flexible diaphragm 25 comprises an annular channel 28 and a seal 37 (e.g. an O-ring seal) is constrained within the annular channel 28 and annular groove 24.

The annular groove 26 has a greater axial extension than the radially outer end 27 of the first flexible diaphragm such that there is an axial spacing between the housing 24 and the radially outer end 27 of the first flexible diaphragm 25 within the annular groove 26. This axial spacing matches the axial spacing available within the annular channel 28 as a result of the O-ring seal 37 having a lesser axial measurement than the annular channel 28. This allows the radially outer end 27 of the first flexible diaphragm 25 to be axially displaced within the annular groove 26 in the housing 24.

The second bearing 6 further comprises a second compliant element which is a second flexible diaphragm 29 that is fixedly connected to the second outer race 8 at its radially inner end and slidably connected to the housing 24 at its radially outer end. The second flexible diaphragm 29 is provided at a second axial end of the stacked bearing structure 1 distal the first bearing 2.

The slidable connection between the second flexible diaphragm 29 and the housing 24 is the same as that for the first flexible diaphragm 25 and the housing 24 shown in FIG. 3.

The first and second flexible diaphragms 25, 29, first and second outer races 4, 8 and the housing 24 define a pressure chamber 30.

Figure 9:
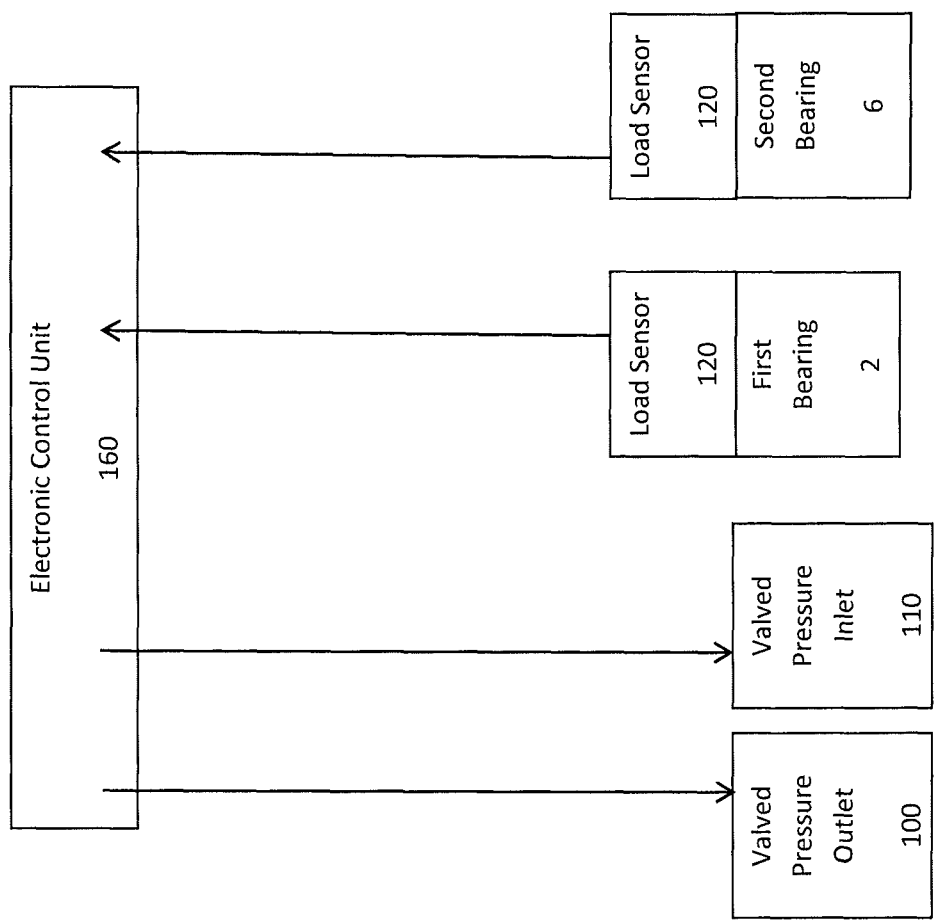
FIG. 9 illustrates a schematic of the ECU and logical connections to the load sensors and valved pressure inlet/outlets.

As can be seen in FIG. 9, a valved pressure inlet 110 is provided through the housing 24 to provide fluid communication from a pressure source to the pressure chamber 30.

A valved pressure outlet 100 is provided through the housing 24 to allow venting of pressure from within the pressure chamber 30.

The stacked bearing structure 1 comprises load sensors 120 associated with each bearing 2, 6. These load sensors 120 are used to monitor the axial loads on each bearing to provide feedback to an electronic control unit (ECU) 160.

The first outer race 4 and second outer race 8 are slidably mounted to one another. The first outer race comprise an axial flange 31 and the second outer race 8 comprises an axial lip 32. The axial flange 31 and axial lip 32 forming a sliding abutment. The axial lip 32 comprises a seal 33 housed in a groove 34 over which the axial flange 31 can slide. This allows the first and second outer races 4, 8 to be axially slidable relative to one another whilst maintaining the sealing of the pressure chamber. This axial displacement (which results in an additional axial load on the bearings 2, 6) can be effected by an adjustment of pressure within the pressure chamber 30 as described below with reference to FIGS. 4 to 7.

Figure 4:
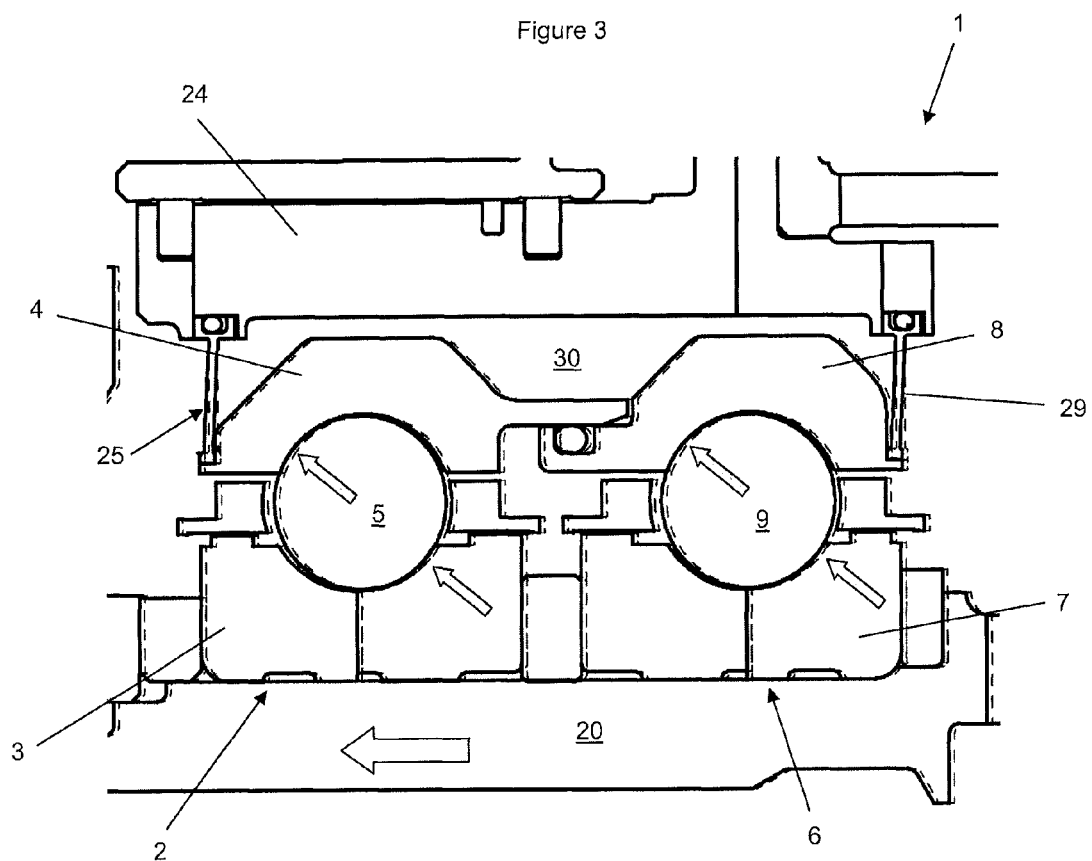
FIGS. 4-7 show the first embodiment in various operational situations.

FIG. 4 shows the stacked bearing structure 1 with a thrust load to the left (upstream) and the pressure chamber 30 unpressurised. In this situation, the thrust loads act to force the bearings 2, 6 upstream as can be seen from the angle of the first and second flexible diaphragms 25, 29. The dotted lines provide an indication of the position of the various components without a thrust load applied as in FIG. 2.

The load sharing between the two bearings 2, 6 should, ideally be equal. However, unbalances occur as a result of geometrical differences between the bearings 2, 6 arising from manufacturing tolerances and thermal expansion anomalies. For example, if the inner races 3, 7 are closer to each other than the outer races 4, 8, a greater load will be carried by the second (downstream) bearing 6 whereas if the outer races 4, 8 are closer to each other than the inner races 3, 7, a greater load will be carried by the first (upstream) bearing 2.

If the load sensors 120 detect that the axial load on either of the bearings 2, 6 has dropped below a predetermined minimum (e.g. 1000 lbf/4450 N), opening of the valved pressure inlet 110 is triggered by the ECU 160 to increase the pressure within the pressure chamber 30 (e.g. using compressed air from the HP compressor).

Figure 5:
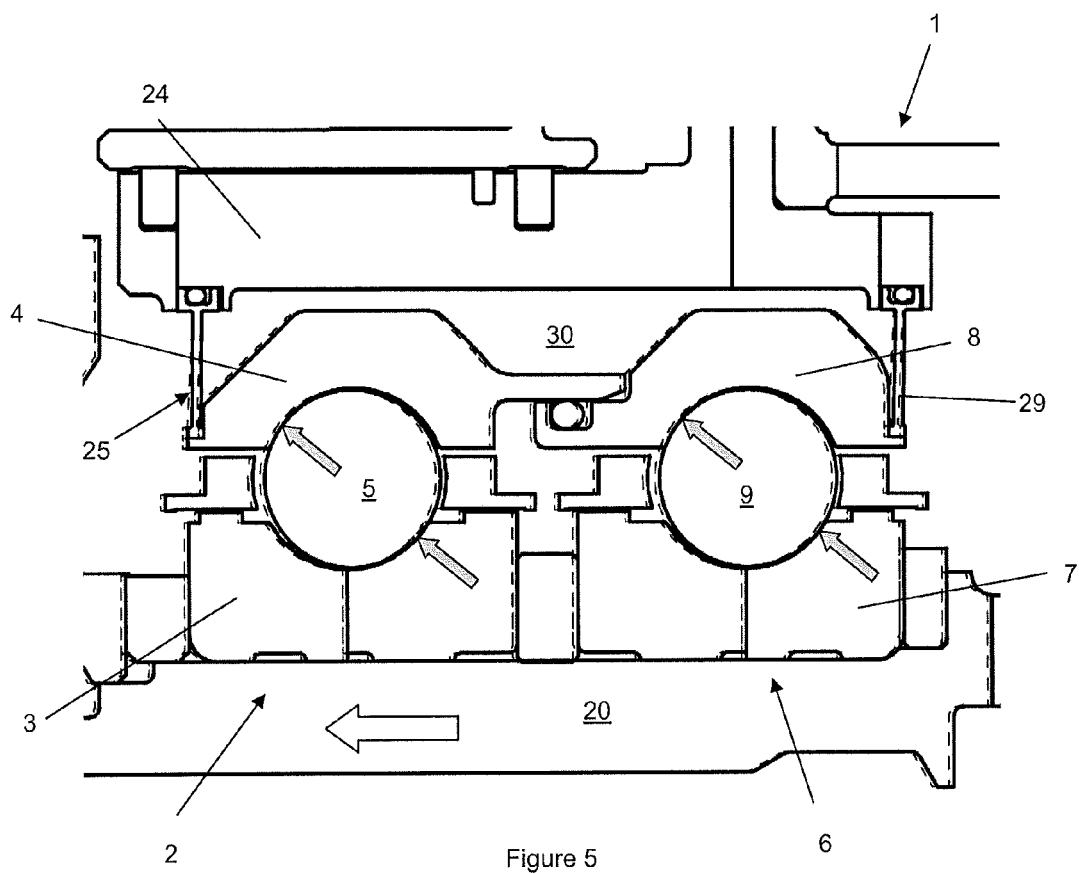

FIG. 5 shows the bearing structure 1 of FIG. 4 after the pressure chamber 30 has been pressurised. The dotted lines provide an indication of the position of the various components with the pressure chamber 30 unpressurised as in FIG. 4.

The increased pressure within the pressure chamber 30 forces the first bearing 2 apart from the second bearing 6 (with the axial flange 31 sliding over the axial lip 32). This imparts an additional axial load to the bearings 2, 6. An additional downstream axial load is applied to the first bearing 2 and an upstream axial load (opposing the thrust load) is applied to the second bearing 6. This increases the thrust load bearing on the under-loaded bearing and decreases the thrust load bearing on the over-loaded bearing.

The magnitude of the induced axial load is less than the magnitude of the thrust load and hence the two bearings 2, 6 remain loaded in an upstream direction.

As discussed above, the thrust load can pass through zero at some points during the flight cycle.

Figure 6:
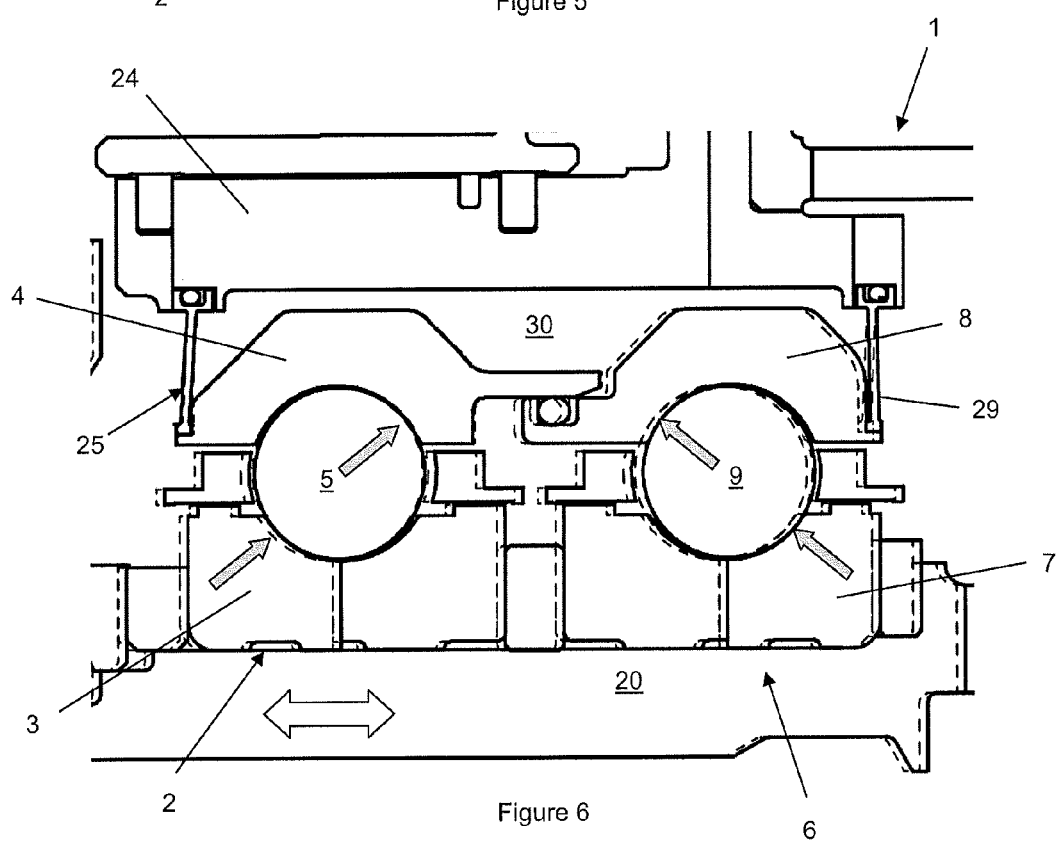

FIG. 6 shows the effect of increasing the pressure in the pressure chamber 30 such that it is greater than the thrust load. The dotted lines provide an indication of the position of the various components with the pressure chamber 30 at a lower pressure as in FIG. 5. At this point, the two bearings 2, 6 are loaded in opposite directions. The bearing 6 slides downstream but bearing 2 is retained close to its previous position by the increased pressure force applied to it.

Figure 7:
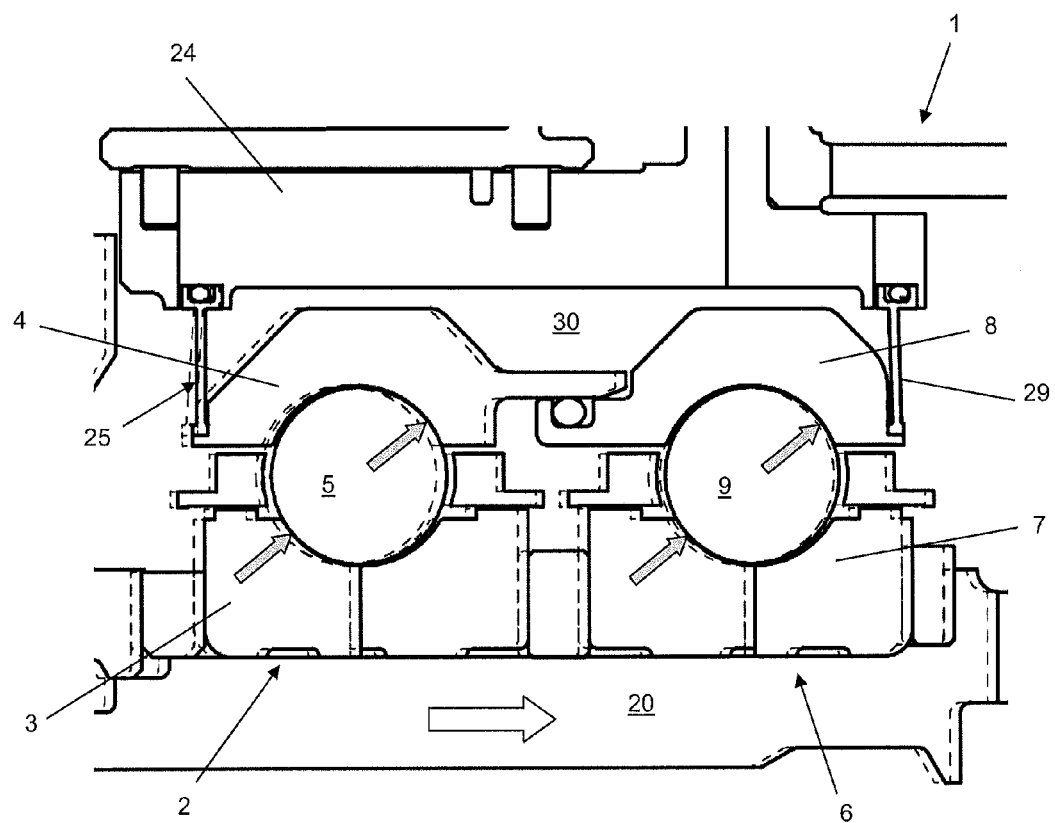

As the axial thrust load reduces, the bearings will remain loaded in opposite directions until the downstream load reaches the predetermined value and the pressurisation is removed. This is shown in FIG. 7 where the dotted lines show the bearing positions as FIG. 6.

Figure 8:
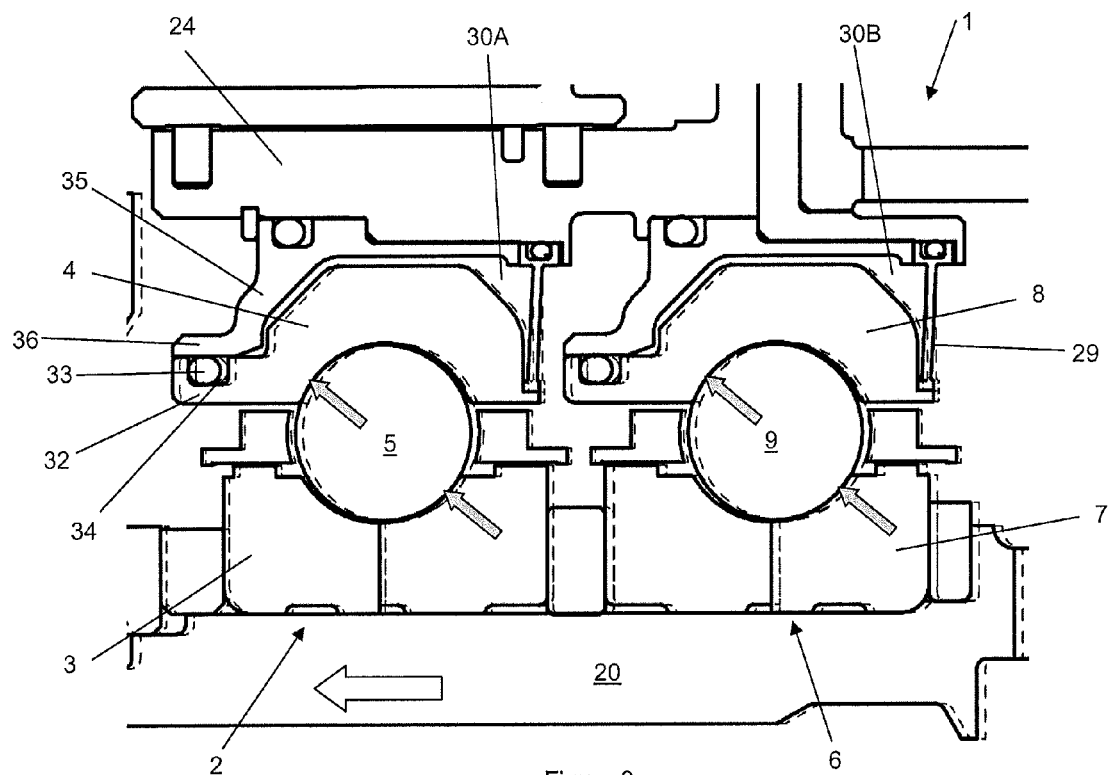
FIG. 8 shows a second embodiment of a stacked bearing structure according to various examples.

FIG. 8 shows a second embodiment where like components have been given the same reference numeral as for the first embodiment.

The second embodiment differs from the first in that the first flexible diaphragm 25, first outer race 4 and housing 24 define a first pressure chamber 30A and the second flexible diaphragm 29, second outer race 8 and housing 24 define a second pressure chamber 30B.

The first flexible diaphragm 25 is proximal the second bearing 6 (towards the axial middle of the stacked bearing structure 1) and the second flexible diaphragm is distal the first bearing 2 (at an axial end of the stacked bearing structure 1). The first and second flexible diaphragms 25, 29 are slidably mounted to the housing in the manner shown in FIG. 3.

The outer races 4, 8 are slidably mounted to the housing 24. The housing 24 comprises a first radial extension 34 against which the first outer race 4 is slidably mounted. The housing 24 further comprises a second radial extension 35 against which the second outer race 8 is slidably mounted. Each radial extension has an annular projection 36, against which a respective annular lip 32 extending from each of the outer races 4, 8 forms a sliding abutment. The axial lips 32 each comprise a respective seal 33 housed in a respective groove 34 for sealing the axial lips 32 against the respective annular projection.

A respective valve pressure inlet (not shown) is provided through the housing 24 to provide fluid communication from a pressure source to each pressure chamber 30A, 30B. The valved pressure inlets are separately operable to allow selective pressurisation of the two pressure chambers, 30A, 30B.

A respective valved pressure outlet 100 is provided through the housing 24 to allow venting of pressure from within each pressure chamber 30A, 30B. The valved pressure outlets 100 are separately operable to allow selective de-pressurisation of the two pressure chambers, 30A, 30B.

The stacked bearing structure 1 comprises load sensors (not shown) associated with each bearing 2, 6. These load sensors are used to monitor the axial loads on each bearing to provide feedback to an electronic control unit (ECU) 160.

If the geometrical inconsistences between the two bearings 2, 6 (arising from manufacturing intolerances and thermal expansion anomalies) result in the inner races 3, 7 being closer together than the outer races, 4, 8, the load sensors 120 will detect a greater loading on the second (downstream) bearing 6. In this case, the ECU 160 triggers pressurisation of the first (upstream) pressure chamber 30A which causes the first outer race 4 to move towards the second outer race 8 thus transferring thrust load to the first (upstream) bearing. Conversely, if the geometrical inconsistences between the two bearings 2, 6 (arising from manufacturing intolerances and thermal expansion anomalies) result in the outer races 4, 8 being closer together than the inner races, 3, 7, the load sensors 120 will detect a greater loading on the first (upstream) bearing 3. In this case, the ECU 160 triggers pressurisation of the second (downstream) pressure chamber 30B. This causes the second upper race 8 to move away from the first upper race 4 thus transferring thrust load to the second (downstream) bearing.

In the second embodiment shown in FIG. 8, the second bearing (which could also be upstream from the first bearing) could be modified to omit the second compliant element and second pressure chamber such that the second bearing is a fixed bearing and only the first bearing is axially slidable to adjust the axial spacing between the first and second outer races and thus the load bearing between the first and second bearings.

While a stacked bearing structure has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the scope as defined in the claims.

It will be appreciated that the ECU can be a general purpose computer configured with a processor, memory and software to perform the above functions. Additionally, the ECU may constitute a field programmable gate array (FPGA), or Application Specific Integrated Circuits (ASICs) to perform the functions described above, or any other suitable processing device capable of being configured to perform the desire functions.

All references referred to above are hereby incorporated by reference.

What is claimed is:

1. A stacked bearing structure comprising:
a first bearing having a first inner race, a first outer race, and a first set of roller elements housed between the first inner race and the first outer race;
a second bearing having a second inner race, a second outer race, and a second set of roller elements housed between the second inner race and the second outer race;
a housing surrounding the first and second bearings; and
a first compliant element fixedly connected to the first outer race, the first compliant element connected between the housing and the first outer race;
a second compliant element fixedly connected to the second outer race, the second compliant element connected between the housing and the second outer race, wherein:
the first compliant element, first outer race, and the housing define a pressure chamber; and
the first outer race is axially slidable relative to the second outer race such that an increase in pressure in the pressure chamber causes a change in axial spacing between the first and second outer races.

2. The stacked bearing structure according to claim 1, wherein:
the first and second compliant elements are provided at opposing axial ends of the stacked bearing structure; and
the first and second compliant elements, outer races, and the housing define a single pressure chamber.

3. The stacked bearing structure according to claim 2, wherein the first outer race and the second outer race are slidably mounted to one another.

4. The stacked bearing structure according to claim 3, wherein one of the first and second outer races includes an axial flange and another one of the first and second outer races includes an axial lip, the axial flange and the axial lip forming a sliding abutment.

5. The stacked bearing structure according to claim 1, wherein:
the first compliant element, first outer race, and the housing define a first pressure chamber; and
the second compliant element, second outer race, and the housing define a second pressure chamber.

6. The stacked bearing structure according to claim 5, wherein the first compliant element is proximal to the second bearing, and the second compliant element is distal to the first bearing.

7. The stacked bearing structure according to claim 5, wherein the first and second outer races are slidably mounted to the housing.

8. The stacked bearing structure according to claim 7, wherein the housing includes a first radial extension against which the first outer race is slidably mounted, and a second radial extension against which the second outer race is slidably mounted.

9. The stacked bearing structure according to claim 1, wherein the first and second compliant elements are slidably mounted to the housing.

10. The stacked bearing structure according to claimed 9, wherein the housing includes a first groove for locating a radially outer end of the first compliant element, and a second groove for locating a radially outer end of the second compliant element.

11. The stacked bearing structure according to claim 10, wherein the first and second grooves have an axial extension that is greater than the axial extension of the radially outer ends of each of the first and second compliant elements so that the radially outer ends of the first and second compliant elements respectively slide within the first and second grooves.

12. The stacked bearing structure according to claim 1, further comprising a valved pressure inlet or a respective valved pressure inlet extending through the housing to provide fluid communication from a pressure source to the, or the respective, pressure chamber.

13. The stacked bearing structure according to claim 1, further comprising a valved pressure outlet or a respective valved pressure outlet extending through the housing to allow venting of pressure from within the, or the respective, pressure chamber.

14. The stacked bearing structure according to claim 1, further comprising at least one load sensor associated with each of the first bearing and the second bearing.

15. The stacked bearing structure according to claim 14, further comprising an electronic control module, the at least one load sensor is configured to monitor axial loads on each of the first and second bearings to provide feedback to the electronic control module.

16. The stacked bearing structure according to claim 15, wherein the electronic control module is configured to trigger pressurisation of the pressure chamber in response to the axial load on the first bearing or the second bearing being below a predetermined minimum value.

17. The stacked bearing structure according to claim 15, wherein the at least one load sensor and the electronic control module are configured to trigger venting of the pressure chamber.

18. A gas turbine engine comprising the stacked bearing structure as claimed in claim 1.

19. The stacked bearing structure according to claim 1, wherein the first compliant element is a flexible diaphragm and the second compliant element is a flexible diaphragm.

* * * * *